Patented Aug. 16, 1932

1,871,868

UNITED STATES PATENT OFFICE

ADOLF WEIHE, OF EILENBURG, AND OTTO LEUCHS AND EDUARD DÖRR, OF ELBERFELD-SONNBORN, GERMANY, ASSIGNORS TO DEUTSCHE CELLULOID-FABRIK, OF EILENBURG I. SA., GERMANY, A CORPORATION OF GERMANY

NITRATED CELLULOSE ETHER

No Drawing. Application filed March 19, 1930, Serial No. 437,268, and in Germany March 25, 1929.

The present invention relates to a new process for manufacturing cellulose ether nitrates and to the new products obtainable by this process.

Assuming that the smallest unit of the cellulose molecule contains three hydroxyl groups capable of being esterified or etherified, those cellulose ethers generally possess the most favorable technical properties in which 2 to 2½ of the three hydroxyl groups are etherified. The complete etherification—as far as at all attainable—and the complete esterification lead to products of unfavorable solubility; particularly the number of solvents which can be used is very small.

With the exception of the water-soluble dimethyl cellulose and the salts of the cellulose-glycollic acid (cf. German Specification No. 332,203 and British Specification No. 138,116) the dialkyl-ethers of cellulose are water-insoluble compounds which are soluble in organic solvents and capable of forming films. On this property their technical utility is based.

Now, the films from cellulose ethers are more or less sensitive to water as may be proved by measuring their tensile strength when in a dry and when in a wet state.

Generally the sensitiveness to water decreases with the increase of alkoxy groups either in number or size.

Hence results a possibility of decreasing the sensitiveness to water and at the same time also the limits thereof.

According to the present invention cellulose ether nitrates of particularly valuable properties are obtainable from cellulose ethers by transforming the free hydroxyl groups into nitrate groups.

Thus, for instance, by introducing 2.5 per cent of nitrogen into a diethyl cellulose which, when moist with water, shows a decrease of tenacity of 20 per cent of the tensile strength when compared with the tenacity when dry, a nitrodiethyl cellulose is obtainable which as regards its tensile strength when wet surprisingly does not differ from a nitrocellulose of equal viscosity, whereas the solubility and the combustibility of the diethyl cellulose are not materially changed. It is also a surprising fact that the completely water-soluble dimethyl cellulose becomes by introduction of, for instance, 4 per cent of nitrogen (in the form of O—NO$_2$) entirely insoluble in water, while it dissolves clearly in methyl acetate, ethyl acetate, butyl acetate or the like.

The nitrodimethyl cellulose is scarcely combustible and is distinguished by very good capacity for forming films. By increasing the nitrogen content up to the almost complete esterification of the available hydroxyl groups of the cellulose ether, products are finally obtainable which are soluble in ether, hydrocarbons, oil of turpentine or the like.

All of these cellulose ether nitrates have hitherto not been described in literature.

By the action of nitric acid or of mixtures of nitric acid and sulfuric acid upon the cellulose ethers in question, not always an unobjectionable product is obtainable. The reaction can, however, be conducted without any difficulties by using diacetyl-ortho-nitric acid, either previously made or formed in the reaction mixture, in the presence of a dehydrating agent.

Diacetyl ortho nitric acid (cf. Pictet and Genequand, Berichte der deutschen Chemischen Gesellschaft, vol. 35, 1902, page 2526, and Houben-Weyl, Die Methoden der organischen Chemie, 1st edition, page 1153) corresponds to the formula

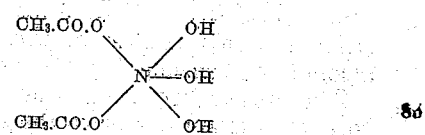

and is a derivative of the hypothetical ortho nitric acid of the formula

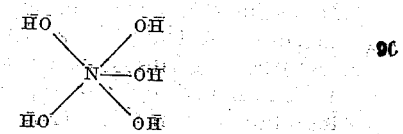

It is a liquid boiling without decomposition at 127.7° C. and may be formed, for instance, by reacting with nitric acid of specific gravity 1.4 upon acetic anhydride.

The cellulose ethers used as starting material dissolve in diacetyl-ortho-nitric acid, and form a clear viscous solution. On addition of a dehydrating agent, for instance, of acetic acid anhydride, the cellulose ether is nitrated within a few minutes. When cooling is adopted during the nitration process, no degradation of the product can be observed. The nitrogen content of the cellulose ether is controlled by the quantity of acid anhydride. If necessary, diluents or further additions, such as catalysts, may be used.

The following examples serve to illustrate our invention:—

Example 1

100 grams of diethyl cellulose are dissolved in 400 grams of diacetyl-ortho-nitric acid. A mixture of 25 grams of glacial acetic acid and 25 grams of acetic acid anhydride is then added at + 10° C. while stirring. After 10 minutes the reaction mixture is poured into water and the precipitated nitro-diethyl cellulose is washed free from acid, preferably by means of cold water. The acid-free compound is stable. It forms white flakes similar to acetylcellulose and dissolves in a mixture of benzene and alcohol, in a mixture of butanol and toluene, in methylglycol ether, ethylglycol ether, in a mixture of benzene, ethylglycol ether and alcohol and many other solvents or mixtures of solvents.

Of an especially high technical value is the solubility of our new diethylnitrocellulose in a mixture of oil of turpentine and aliphatic alcohols.

Example 2

100 grams of dimethyl cellulose are dissolved in 600 grams of diacetyl-ortho-nitric acid.

50 grams of acetic acid anhydride are then added while cooling and stirring. After 10 minutes the product is precipitated and washed free from acid as described in Example 1. It forms a flaky or fibrous mass which is insoluble in water. It dissolves in methyl acetate, ethyl acetate, butyl acetate, in mixtures of the said esters with alcohol and benzene, in methyl glycol ether, ethyl glycol ether and in mixtures of these ethers with alcohol and benzene.

The present invention is not limited to the foregoing examples or to the specific details given therein. Thus, for instance, we may use other cellulose ethers, such as cellulose monoethers or benzyl ethers of celluloses as starting materials. The nitrogen content of the nitrated cellulose ethers may be increased or diminished by varying correspondingly the quantities of the nitrating agent. Other nitrating agents, known in the art, may be used; we prefer, however, to use diacetyl-ortho-nitric acid.

We contemplate as included within our invention all such modifications and equivalents as fall within the scope of the appended claims.

What we claim is:—

1. The process which comprises acting upon an alkyl cellulose containing in the cellulose molecule unsubstituted hydroxyl groups with diacetyl-ortho-nitric acid in the presence of a dehydrating agent.

2. The process which comprises dissolving an alkyl cellulose containing in the cellulose molecule unsubstituted hydroxyl groups in diacetyl-ortho-nitric acid and adding a dehydrating agent.

3. The process which comprises dissolving an alkyl cellulose containing in the cellulose molecule unsubstituted hydroxyl groups in diacetyl-ortho-nitric acid and adding acetic acid anhydride.

4. The process which comprises acting upon a dialkyl cellulose with diacetyl-ortho-nitric acid in the presence of a dehydrating agent.

5. The process which comprises dissolving a dialkyl cellulose in diacetyl-ortho-nitric acid and adding a dehydrating agent.

6. The process which comprises dissolving a dialkyl cellulose in diacetyl-ortho-nitric acid and adding acetic acid anhydride.

7. The process which comprises acting upon diethyl cellulose with diacetyl-ortho-nitric acid in the presence of a dehydrating agent.

8. The process which comprises dissolving a diethyl cellulose in diacetyl-ortho-nitric acid and adding a dehydrating agent.

9. The process which comprises dissolving diethyl cellulose in diacetyl-ortho-nitric acid and adding acetic acid anhydride.

10. As a new product a cellulose ether nitrate being a white stable product insoluble in water and insensitive to the action of water, but soluble in alkyl acetates, glycol alkyl ethers and mixtures of aliphatic alcohols and liquid aromatic hydrocarbons.

11. As a new product a nitrated cellulose alkyl ether being a white stable product insoluble in water and insensitive to the action of water, but soluble in alkyl acetates, glycol alkyl ethers and mixtures of aliphatic alcohols and liquid aromatic hydrocarbons.

12. As a new product a nitrated cellulose dialkyl ether being a white stable product insoluble in water and insensitive to the action of water, but soluble in alkyl acetates, glycol alkyl ethers and mixtures of aliphatic alcohols and liquid aromatic hydrocarbons.

13. As a new product nitrodiethyl cellulose being a white stable product insoluble in water and insensitive to the action of water, but soluble in glycol alkyl ethers, in a mixture of benzene and ethanol, of toluene and butanol and of oil of turpentine and ethanol.

14. The process which comprises acting upon dimethyl cellulose with diacetyl-ortho-nitric acid in the presence of a dehydrating agent.

15. The process which comprises dissolving a dimethyl cellulose in diacetyl-orthonitric acid and adding a dehydrating agent.

16. The process which comprises dissolving a dimethyl cellulose in diacetyl-orthonitric acid and adding acetic acid anhydride.

17. As a new product nitrodimethyl cellulose being a white stable product insoluble in water and insensitive to the action of water, but soluble in glycol alkyl ethers, alkyl acetates, and in mixtures of these solvents with alcohol and benzene.

In testimony whereof, we affix our signatures.

ADOLF WEIHE.
OTTO LEUCHS.
EDUARD DÖRR.